INVENTORS
HENRY JOSEPH LOVEGROVE
HORACE FRANK SMITH
By Rudolph␣Jurick
ATTORNEY

United States Patent Office 3,023,621
Patented Mar. 6, 1962

3,023,621
ELECTRIC CONTROL, DETECTION OR MEASURING SYSTEM
Henry Joseph Lovegrove, Hadley Wood, Barnet, and Horace Frank Smith, Leytonstone, London, England, assignors, by mesne assignments, to Daystrom, Incorporated, Murray Hill, N.J., a corporation of New Jersey
Filed Nov. 29, 1957, Ser. No. 699,743
Claims priority, application Great Britain Dec. 27, 1956
5 Claims. (Cl. 73—359)

The invention relates to electrical systems comprising mutually controlled oscillators and moving coil instruments.

There has been developed a system of the kind referred to, wherein a sensitive moving coil instrument is connected as a null indicator in a potentiometer circuit, and wherein a reactance control device deriving motion from the moving coil exercises an absorption of detuning effect on a valve oscillator circuit and so is caused to control the current in the anode circuit of the oscillator which, in turn, is employed to establish a voltage or current to balance any originating effect tending to unbalance the potentiometer.

There has also been developed a generally similar system in which the moving coil instrument is arranged to control a variable capacitance forming part of the valve oscillator circuit and adapted to vary the oscillation amplitude.

Such systems may be employed for the accurate measurement of current or voltage by employing indicating instruments to measure a current dependent on the variation of the oscillator output and proportional to the input current or voltage to be measured. When the originating factor causing the unbalance in the potentiometer is a quantity other than current or voltage, but bearing a known relation to current or voltage, the indicating instrument may be calibrated in terms of the said quantity.

An object of the present invention is generally to devise improved systems of this and generally related types and to extend their field of application including direct current amplification and measurement of temperature including cold-end compensation of thermo-couples.

According to the present invention an electrical automatic control detection or measuring system comprises a transistor oscillator and a direct current moving coil instrument electro-mechanically coupled together in such a manner that an initiating deflection of the moving coil controls a reactive element in the oscillator circuit and so controls the amplitude of oscillation, an input circuit for applying a variable current or voltage to the movable coil and means responsive to the level of said oscillations to develop a current or voltage which tends to balance the said input current or voltage and so to oppose the motion of the moving coil causing the variation of level of the oscillations.

Most conveniently, the transistor oscillator is followed by a transistor amplifier stage arranged so that any change at the input to the moving coil is reflected in an amplified change of emitter-collector current in the transistor amplifier. The system may therefore be adapted to direct current amplification.

Exemplary embodiments of systems according to the invention will now be briefly indicated with reference to the accompanying drawings, in which.

Figure 1:
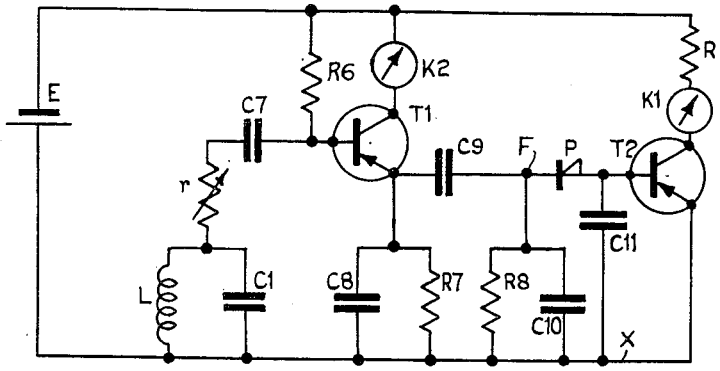
FIG. 1 shows one form of transistor oscillator and amplifier circuit which may be used in the present invention.

Reference will first be made to FIG. 1 in which T1 and T2 are two (p-n-p) junction transistors.

The transistor T1 is arranged as a grounded emitter stage modified to form a feedback oscillator with a feedback path to the base electrode through oscillatory circuit L, C1, resistor r and capacitor C7.

In the non-oscillating condition the collector current of the transistor T1, measured by indicating instrument K2, is controlled and held at a steady direct current value by its base current which is fed from the biasing battery E through the resistors R6 and R7, the latter being shunted by the capacitor C8.

The circuit so far described will be self-excited and will be maintained in an oscillatory condition provided the circuit parameters are suitably adjusted. When a steady oscillation persists there is superimposed upon the D.C. collector current of the transistor T1 an oscillating component which is controlled by the oscillating potential between the point of the base electrode and point X. An oscillating potential is accordingly fed back to the base through resistor r and capacitor C7 and serves to maintain an oscillating potential across the oscillatory "tank" circuit L, C1. In the oscillatory condition, the passage of the alternating component of the collector current of the transistor T1 is facilitated by the capacitor C8, whose value is adjusted to maintain an oscillating potential of suitable amplitude across the resistor R7.

If the Q value of the tuned circuit L, C1 is too low the damping factor of the circuit will be too high for self-oscillation to take place. Also, the inherent damping characteristics of the transistor are such that above a certain frequency range it is difficult to maintain self-oscillation. Consequently, if the equivalent L/C value of the tuned circuit L, C1 is too low, self-oscillation will again not take place. It is thus evident that control of the oscillation amplitude can be effected by varying any one or more of the Q, L or C values of the tuned circuit L, C1.

If the inductance L is a simple air-cored coil of combined L and Q values which put it beyond the range of sustained oscillation, a control device for this purpose may consist of a plug of ferrite or iron dust material having a high magnetic permeability and low loss characteristic at the relevant frequency, which plug, when introduced into the coil, can simultaneously raise both the L and Q values sufficiently to produce sustained oscillations of substantial amplitude.

The capacitor C9 in series with the parallel combination of resistor R8 and capacitor C10, is shunted across the resistor R7. This shunt path carries a fraction of the alternating component of the emitter-collector current of the transistor T1 and establishes an alternating potential between points F and X of the circuit.

Between the point F and the base of the transistor T2 is connected a rectifier P which, with the aid of the smoothing capacitor C11, establishes on the base of the transistor T2 a steady negative potential with respect to its emitter when the circuit of transistor T1 is oscillating. This negative potential controls the direct collector current flowing through the transistor T2 and the resistor R; this current is measured by the indicating instrument K1.

When the tuned circuit L, C1 is not oscillating the resistor/capacitor combination R8, C10 carries no alternating current and points F and X are at practically the same potential and the collector current of T2 is consequently very low while the effective emitter-to-collector resistance of such transistor is very high. When the tuned circuit L, C1 oscillates in conjunction with feedback from the collector circuit of transistor T1, there is an increase of the collector current in transistor T2 dependent on the amplitude of the oscillations. This is equivalent to a decrease in the effective resistance of the emitter-to-collector circuit of transistor T2. Control of the amplitude of oscillation in the tuned circuit L, C1 will thus also control the effective emitter-to-collector resistance of transistor T2 to direct current from the battery E. This control can therefore be effected by varying one or more of the values Q, L or C of the tuned circuit L, C1.

In a practical example of the circuit arrangement of FIG. 1, the inductance L was in the form of a cylindrical coil consisting of 120 turns of fine copper wire (No. 40 S.W.G.), the coil having an inside diameter of approximately 1/8", an outside diameter of 9/32" and an axial length of 3/32". A solid cylindrical plug of ferrite or iron dust of approximately 3/32" diameter and 1/4" length was arranged to be movable substantially axially into and out of the coil from one extreme position where the plug was just outside the coil to an opposite extreme position where the plug was disposed symmetrically inside the coil. In the outside position of the plug with reference to the coil, it was found necessary, owing to variation of the characteristics of different transistors, to make the damping resistor $r$ adjustable so that its value could be altered to that which is just sufficient to prevent oscillation when the plug is in a convenient initial or starting position. With this adjusted value of the resistance $r$, movement of the ferrite plug through a distance of about 1/8" necessary to bring it within the coil, sufficed to alter the collector current of the transistor T2 from a value of 0.05 mA to 2 mA.

The remaining component values of the circuit arrangement were as follows:

| | |
|---|---|
| E | 4.5 volts dry battery. |
| C1 | 0.0005 microfarads. |
| C7 | 0.1 microfarads. |
| C8 | 0.001 microfarads. |
| C9 | 0.1 microfarads. |
| C10 | 0.0015 microfarads. |
| C11 | 0.1 microfarads. |
| R6 | 20,000 ohms. |
| R7 | 1,000 ohms. |
| R8 | 4,000 ohms. |
| R2 | 2,000 ohms. |
| r | variable 0 to 500 ohms. |

Transistors T1 and T2 were both Mullard type OC 71 while the rectifier comprised two parallel-connected B.T.H. type CS. The frequency of oscillation was approximately 350,000 cycles per second.

Figure 2:
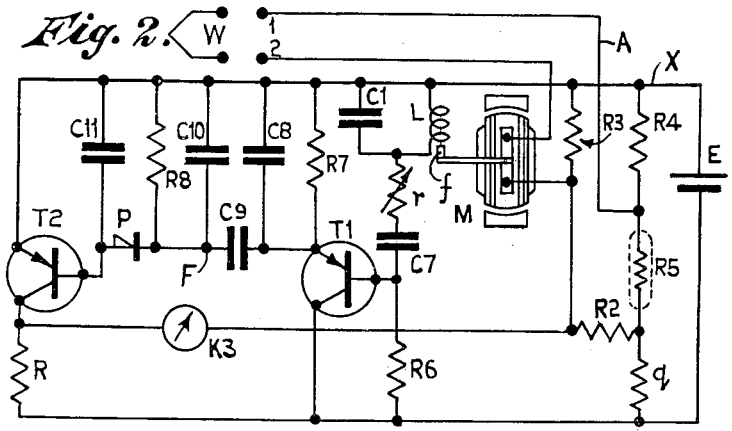
FIG. 2 shows an automatic control, detection or measuring system including the oscillator/amplifier circuit of FIG. 1.
Figure 3:
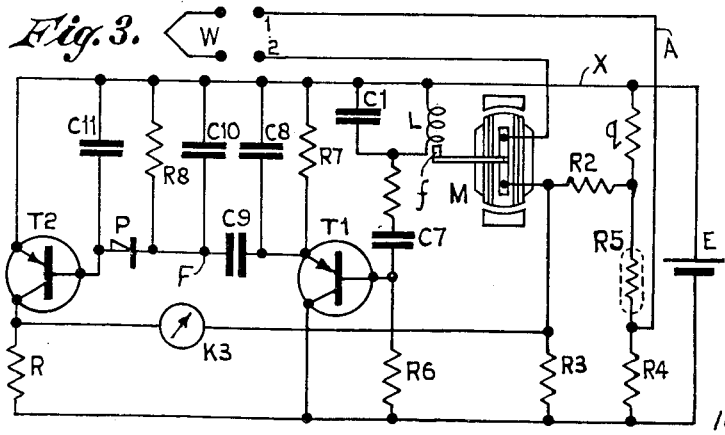
FIG. 3 shows a modification of the arrangement of FIG. 2.

The manner of incorporating this transistor oscillator-amplifier circuit into an automatic measurement or control system can be seen by reference to FIGS. 2 and 3 which show, in schematic form, the application of the invention for use with thermo-couples in the measurement of temperature and including cold-end compensation.

In the arrangement of FIG. 2, W indicates a thermo-couple for connection to the input terminals 1 and 2. A sensitive direct current moving coil instrument has its moving coil M mechanically coupled to a device for varying one or more of the Q, L and C values of the oscillator tank circuit L, C1. This device may and as shown comprise a small plug of ferrite $f$ as already described mounted on the end of an arm which replaces the moving coil pointer or equivalent moving element so as to move towards and away from the inductance coil L. The moving coil M is electrically connected in series with the input terminals 1, 2 across a bridge circuit arrangement of resistors R2, R3, R4, R5 constituting a "cold-end" compensating bridge network for the thermo-couple W. E represents a stabilised voltage supply source and $q$ is a voltage dropping resistor. Otherwise the circuit components are similar to those in FIG. 1, and are indicated accordingly by corresponding reference characters.

Resistors R2, R3, R4 are of non-temperature-sensitive material such as "manganin," whilst resistor R5 is of copper or nickel, or other suitable material whose resistance is a function of temperature. In order that the cold end of the thermo-couple may be properly compensated, any extraneous temperature influences, e.g. due to current in the connecting wires, must be avoided, and for this purpose, the lead A from terminal 1 to the resistor R5 is made of material having the same thermo-electric potential as the thermo-couple wire to which it is attached. The cold end of the thermo-couple is then, in effect, at the junction of lead A and the copper wire of the resistance spool R5. This junction is thus effectively in thermal contact with the resistance spool R5 and cold-end compensation will be effected if the winding of resistor R5 is at the same temperature as the junction. This is assisted by winding the resistor R5 on an insulated copper slug.

The circuit is arranged so that with terminals 1, 2 short circuited there is no current through the moving coil M. The value of resistor $q$ is so chosen that, with the circuit in this condition there is no current through the indicating instrument K3. The oscillator circuit of transistor T1 may be arranged to be on the threshold of oscillation when the bridge is initially balanced but, more preferably, the initial balance condition is chosen as one when the ferrite plug $f$ is in the position where it establishes the effective emitter-to-collector resistance of transistor T2 at a value which is approximately the mean of its minimum value, i.e. that which occurs when the plug is fully inserted and maximum oscillation amplitude ensues, and its maximum value, i.e. that which occurs when the plug is fully withdrawn and the oscillations in the circuit just collapse.

When in operation with the thermo-couple W connected to terminals 1, 2, the applied E.M.F. will cause an unbalance effect upon the bridge network and, by movement of the moving coil M, will vary the Q and L values of the oscillator inductance L thus varying the direct potential between the base of transistor T2 and its emitter as described above with reference to FIG. 1. By suitably proportioning the values of the bridge resistors in relation to the stabilised supply voltage, the bridge circuit can be arranged to supply a counterbalancing E.M.F. to the input terminals 1, 2 and the current indicator K3 will indicate a current suitably proportioned to the temperature to be measured, whilst no current is drawn from the input source connected to terminals 1, 2. At balance, the E.M.F. in the thermo-couple arm is proportional to the increase in current through resistor R2 and the resistors R2 and R3 contribute to the balancing of the circuit and determine the range of instrument K3, i.e. the ratio between the measured current and the E.M.F. at the input.

With the arrangement of FIG. 2 adjusted so that its initial balance condition is obtained when the effective emitter-to-collector resistance of transistor T2 is at its mean value as described the input to the moving coil M may be such as will produce either an increase or a decrease of the amplitude level of the oscillation output of transistor T1. If, on the other hand, the initial balance condition is one when the effective emitter-to-collector resistance of transistor T2 is at its maximum value and the circuit of transistor T1 is just on the threshold of oscillation, the applied input to the moving coil M must be such that an increase of amplitude level of the oscillation output occurs.

If it is desired to effect initial balance when the effective emitter-to-collector resistance of transistor T2 is at a minimum value and the applied input to the moving coil M is such as to produce a decrease of the amplitude level of the oscillation output from transistor T1, the circuit of FIG. 2 may be rearranged as shown in FIG. 3 by inverting the bridge network components R2, R3, R4, R5 and $q$.

As an alternative to the use of a ferrite plug for altering both the Q and L values of the tuned circuit, the moving coil instrument can be adapted to vary the Q value of the tuned circuit by means of a metal vane carried on the pointer arm. A further possible alternative consists in adapting the meter movement to vary the capacitance of the condenser C1, e.g. by making one of the plates of the condenser movable with the movable coil M.

Although the invention has been more particularly described in connection with its application to temperature measurement with a thermo-couple, it will be obvious that it has other applications.

We claim:

1. In an electrical control system, first and second junction transistors, each with a base, an emitter and a collector, a source of direct current with one pole connected to the base of said first transistor through a first resistor and its other pole connected to the emitter of said first transistor through a second resistor shunted by a first capacitor, an LC oscillatory tank circuit in series with a third resistor and a second capacitor also connected between said other pole and said base, a third capacitor in series with a fourth capacitor-shunted fourth resistor and shunted across said second resistor, to establish an alternating potential across said capacitor-shunted resistor, a rectifier connected between the junction of said third capacitor and said fourth capacitor-shunted fourth resistor and the base of the second transistor and a fifth capacitor-shunted between the junction of the second transistor base and the rectifier and the emitter of said second transistor, to establish on the base of said second transistor a steady negative potential with respect to its emitter, when the circuit of the first transistor is oscillating, a sensitive direct current moving coil instrument, means mechanically coupling the moving coil thereof to a device for varying one of the Q L & C values of the oscillatory tank circuit, means electrically connecting the moving coil in series with the terminals of a thermo-couple across a bridge circuit arrangement of four resistors constituting a cold-end compensating bridge network for said thermo-couple, with the source of direct current polarizing the opposite terminals of said bridge circuit arrangement, three of said four resistors being of non-temperature-sensitive material, while the fourth of said resistors is of suitable material whose resistance is a function of temperature, so that said thermo-couple when used to measure temperature will upset the balance of the coil and cause a corresponding variation in the oscillatory condition of the circuit, to thereby balance the potential developed at the thermo-couple, with the bridge circuit fourth resistor compensating for the cold ends of the thermo-couple elements, whereby a measurement of the output current from the second transistor will indicate the temperature being measured.

2. In an electrical control system, first and second junction transistors, each with a base, an emitter and a collector, a source of direct current with one pole connected to the base of said first transistor through a first resistor and the other pole connected to the emitter of said first transistor through a second resistor shunted by a first capacitor, an LC oscillatory tank circuit in series with a third resistor and a second capacitor also connected between said other pole and said base, a third capacitor in series with a fourth capacitor-shunted fourth resistor and shunted across said second resistor to establish an alternating potential across said capacitor-shunted resistor, a rectifier connected between the junction of said third capacitor and said fourth capacitor-shunted fourth resistor and the base of the second transistor and a fifth capacitor shunted between the junction of the second transistor base and the rectifier and the emitter of said second transistor, to establish on the base of said second transistor a steady negative potential with respect to its emitter, when the circuit of the first transistor is oscillating, a sensitive direct current moving coil instrument, means mechanically coupling the moving coil thereof to a device for varying one of the Q, L & C values of the oscillatory tank circuit, means electrically connecting the moving coil in series with the terminals of a thermo-couple across a bridge circuit arrangement, with the source of direct current polarizing the opposite terminals of said bridge circuit arrangement, so that said thermo-couple when used to measure temperature will upset the balance of the coil and cause a corresponding variation in the oscillatory condition of the circuit, to thereby balance the potential developed at the thermo-couple, whereby a measurement of the output current from the second transistor will indicate the temperature being measured.

3. In an electrical control system, first and second transistors, each with a base, an emitter and a collector, a source of direct current with its poles respectively connected to the base and the emitter of said first transistor, an LC oscillatory tank circuit in series with a resistor and a capacitor also connected between the emitter-connected pole of said source and said base, means shunted across said resistor to establish an alternating potential at the emitter of said first transistor, a rectifier, connected between the emitter of the first transistor and the base of the second transistor, and associated means, to establish on the base of the second transistor a steady negative potential with respect to its emitter, when the circuit of the first transistor is oscillating, a sensitive direct current moving coil instrument, means mechanically coupling the moving coil thereof to a device for varying one of the Q, L, and C values of the oscillatory tank circuit, means electrically connecting the moving coil with means supplying varying potential representing a condition to be controlled across a bridge circuit arrangement, with the source of direct current polarizing the opposite terminals of said bridge arrangement, so that said varying potential supply means will upset the balance of the coil and cause a corresponding variation in the oscillatory condition of the circuit, to thereby balance said potential, whereby a measurement of the output from the second transistor may be used to indicate the condition to be controlled.

4. In an electrical control system, a transistor, an oscillatory circuit and a direct current moving coil instrument, means coupling said transistor, oscillatory circuit and instrument so that deflection of the moving coil controls a reactive element in the oscillatory circuit and the amplitude of oscillations, therein, an input circuit including a thermo-couple for applying voltage to the moving coil to, in the measurement of temperature, deflect said coil from zero position, means responsive to the level of said oscillations to develop a counterbalancing voltage to counteract said deflection, and means for amplifying said counterbalancing voltage, wherein said thermo-couple is connected through the moving coil instrument across a bridge network of resistors arranged so that the cold junction of the thermo-couple is effectively in thermal contact with a bridge arm whose resistance is a function of temperature, in order to effect cold end compensation.

5. In an electrical control system, a first transistor with a base, an emitter and a collector, a source of direct current with its poles respectively connected to the base and the emitter, an oscillatory tank circuit connected between the emitter-connected pole of said source and said base, means shunted across said oscillatory circuit and resistor to establish an alternating potential at the emitter, a second transistor with a base, an emitter and a collector, a rectifier connected between the emitter of the first transistor and the base of the second transistor, means to establish on the base of the second transistor a potential negative with respect to its emitter, when the oscillatory tank circuit is oscillating, a direct current moving coil instrument, means coupling the moving coil thereof to the oscillatory tank circuit to control the operation thereof, means electrically connecting the moving coil with a source of potential, varying to represent a condition to be controlled, across a bridge circuit arrangement, with the source of direct current polarizing the opposite terminals of said arrangement, so that upon the balance of the coil being upset by the varying of the potential supplied thereto, a corresponding variation will occur in the oscillatory circuit, to thereby balance said potential, whereby a measurement of the output from the second transistor may be used to indicate the condition to be controlled.

References Cited in the file of this patent

UNITED STATES PATENTS

| | | |
|---|---|---|
| 1,228,678 | Johnson | June 5, 1917 |
| 2,109,776 | Johnson | Mar. 1, 1938 |
| 2,367,868 | Jones | Jan. 23, 1945 |
| 2,527,797 | Cohen | Oct. 31, 1950 |
| 2,530,109 | Wild | Nov. 14, 1950 |
| 2,614,163 | Roper | Oct. 14, 1952 |
| 2,907,931 | Moore | Oct. 6, 1954 |
| 2,778,942 | Ehret et al. | Jan. 22, 1957 |
| 2,847,625 | Popowsky | Aug. 12, 1958 |
| 2,889,496 | Moore | June 2, 1959 |